US010824897B1

(12) United States Patent
Cao et al.

(10) Patent No.: US 10,824,897 B1
(45) Date of Patent: Nov. 3, 2020

(54) DETECTING AN IDENTITY OF A BRAND AND/OR AN OBFUSCATED IDENTITY OF THE BRAND WITHIN AN IMAGE BASED ON EMBEDDINGS CORRESPONDING TO REGIONS OF INTEREST WITHIN THE IMAGE

(71) Applicant: Facebook, Inc., Menlo Park, CA (US)

(72) Inventors: Yu Cao, Union City, CA (US); Gilbert Leung, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 45 days.

(21) Appl. No.: 16/365,595

(22) Filed: Mar. 26, 2019

(51) Int. Cl.
| | | |
|---|---|---|
| *G06K 9/00* | (2006.01) | |
| *G06K 9/32* | (2006.01) | |
| *G06K 9/62* | (2006.01) | |
| *G06N 20/00* | (2019.01) | |
| *H04L 9/36* | (2006.01) | |
| *G06Q 50/00* | (2012.01) | |

(52) U.S. Cl.
CPC ......... *G06K 9/3241* (2013.01); *G06K 9/6202* (2013.01); *G06K 9/6276* (2013.01); *G06N 20/00* (2019.01); *H04L 9/36* (2013.01); *G06Q 50/01* (2013.01); *H04L 2209/16* (2013.01)

(58) Field of Classification Search
CPC .. G06K 9/3241; G06K 9/6202; G06K 9/6276; G06N 20/00; H04L 9/36; H04L 2209/16; G06Q 50/01
USPC ......................................................... 382/159
See application file for complete search history.

(56) References Cited

U.S. PATENT DOCUMENTS

| | | | | |
|---|---|---|---|---|
| 8,885,984 B1* | 11/2014 | Lavi | ....................... | G06F 16/535 |
| | | | | 382/305 |
| 9,367,770 B2* | 6/2016 | Footen | ............... | G06K 7/10861 |
| 9,934,591 B2* | 4/2018 | Babenko | .................. | G06T 7/75 |
| 10,217,236 B2* | 2/2019 | Kraft | .................... | G06K 9/4609 |
| 10,325,184 B2* | 6/2019 | Brunner | ............... | G06K 9/6276 |
| 10,565,475 B2* | 2/2020 | Lecue | .................... | G06N 5/003 |
| 10,606,885 B2* | 3/2020 | Brundage | ............. | G06F 16/583 |
| 10,650,009 B2* | 5/2020 | Tanikella | ............... | G06F 16/285 |
| 10,678,786 B2* | 6/2020 | Zeng | ....................... | G06N 5/022 |
| 10,685,183 B1* | 6/2020 | Arfa | ........................ | G06N 20/00 |
| 10,685,184 B1* | 6/2020 | Arfa | ........................ | G06Q 50/01 |
| 2015/0310601 A1* | 10/2015 | Rodriguez | ........... | G07G 1/0072 |
| | | | | 348/150 |

* cited by examiner

*Primary Examiner* — Jonathan S Lee
(74) *Attorney, Agent, or Firm* — Fenwick & West LLP

(57) ABSTRACT

An online system receives an image associated with a set of pixel values and provides the set of pixel values to a deep learning or machine-learned model that is trained to assign a set of regions of interest within the image to one or more classes. The model is structured to identify the set of regions of interest based on the pixel values, in which each region of interest is associated with an embedding corresponding to a vector representation of the region of interest. The online system compares each embedding to a database of embeddings associated with multiple labeled images, in which the labels indicate an identity of a brand and/or an obfuscated identity of the brand. The online system then determines whether the identity of the brand and/or the obfuscated identity of the brand is/are detected within each region of interest based on the comparison.

20 Claims, 3 Drawing Sheets

DETECTING AN IDENTITY OF A BRAND AND/OR AN OBFUSCATED IDENTITY OF THE BRAND WITHIN AN IMAGE BASED ON EMBEDDINGS CORRESPONDING TO REGIONS OF INTEREST WITHIN THE IMAGE

TECHNICAL FIELD

This disclosure relates generally to online systems, and more specifically to detecting an identity of a brand and/or an obfuscated identity of the brand within an image based on embeddings corresponding to regions of interest within the image.

BACKGROUND

Conventionally, online systems allow their users to connect to and communicate with other online system users by allowing the users to create and share content items for presentation to additional online system users. For example, users of an online system may share photos or videos they have uploaded by creating content items that include the photos or videos that are presented to additional users to whom they are connected in the online system. Images within content items may include various types of content that indicate an identity of a brand or other entity (e.g., an organization). For example, a content item may include an image of a t-shirt having a logo for a particular brand.

Online systems may make various determinations based on whether images within the content items include content that indicates an identity of a brand or other entity. For example, an online system may determine that a purpose of the content item in the above example is to sell a branded product based on the logo for the brand and may use this determination when selecting content for presentation to users of the online system, such that the content item is presented only to users who are likely to be interested in purchasing the product. As an additional example, an online system may determine that an image within a content item violates a policy prohibiting offensive, hateful, or harmful content if the image includes a symbol or a logo associated with a terrorist organization.

However, due to the significant amount of user-created content posted to online systems, online systems may have difficulty detecting images within content items that include content that indicates an identity of a brand or other entity. For example, an online system may be unable to determine that an image within a content item violates a policy because the image includes a symbol associated with a hate group until after the content item has been presented to several online system users. Furthermore, the task of detecting images within content items that include such content may be complicated if the content is obfuscated (e.g., if a logo for a brand is intentionally or unintentionally blurred, obscured, etc.).

SUMMARY

Online systems may allow their users to create and share content items for presentation to additional online system users. Images within these content items may include various types of content that indicate an identity of a brand, an organization, or other entity. The online systems may make various determinations based on whether the images within the content items include this type of content (e.g., the purpose of the content items, whether the images violate a policy, etc.). However, online systems may have difficulty making these determinations due to the significant amount of user-created content posted to online systems, especially if the content is obfuscated.

To resolve this issue, an online system detects identities of brands and/or obfuscated identities of the brands within images based on embeddings corresponding to regions of interest within the images. More specifically, the online system receives an image associated with a set of pixel values and provides the set of pixel values to a deep learning or machine-learned model that is structured to identify a set of regions of interest within the image to one or more classes (e.g., one or more classes indicating various types of objects within the set of regions of interest). The model identifies the set of regions of interest within the image based on the pixel values, in which each region of interest is associated with an embedding corresponding to a vector representation of the region of interest. The embedding may be extracted from the values of one or more layers of the model. The online system provides the embedding associated with each region of interest as an input to another classifier which outputs a label that indicates an identity of a brand or an obfuscated identity of the brand. In some embodiments, this may be done by comparing the embedding to a database of embeddings associated with multiple labeled images and determining whether the identity of the brand and/or the obfuscated identity of the brand is/are detected within each region of interest based on the comparison. In such embodiments, the comparison may be performed using a k-nearest neighbors classifier that identifies embeddings nearest to the embedding associated with each region of interest (e.g., using a k-nearest neighbors classifier) and determines a label based on the labels of these neighbors. The online system may then make various determinations based on whether the identity of the brand and/or the obfuscated identity of the brand is/are detected within each region of interest within the image (e.g., whether the image violates a policy, a purpose of a content item including the image, etc.).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
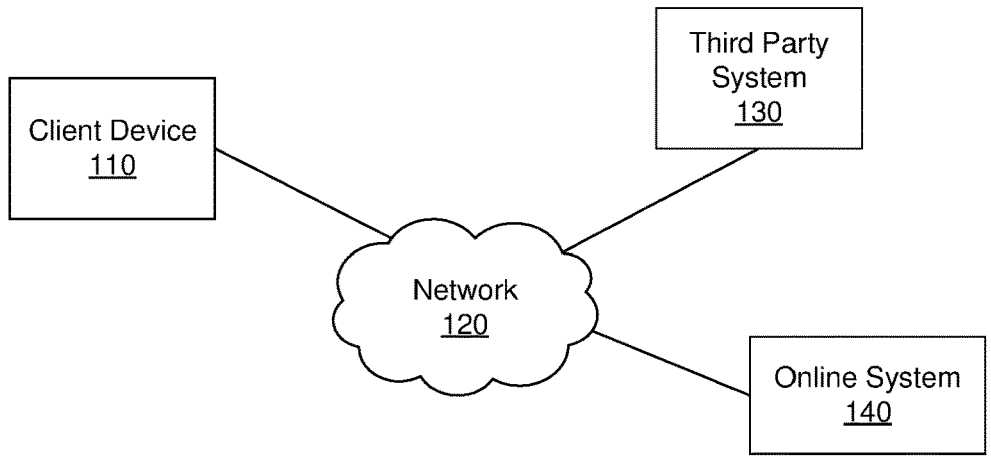
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
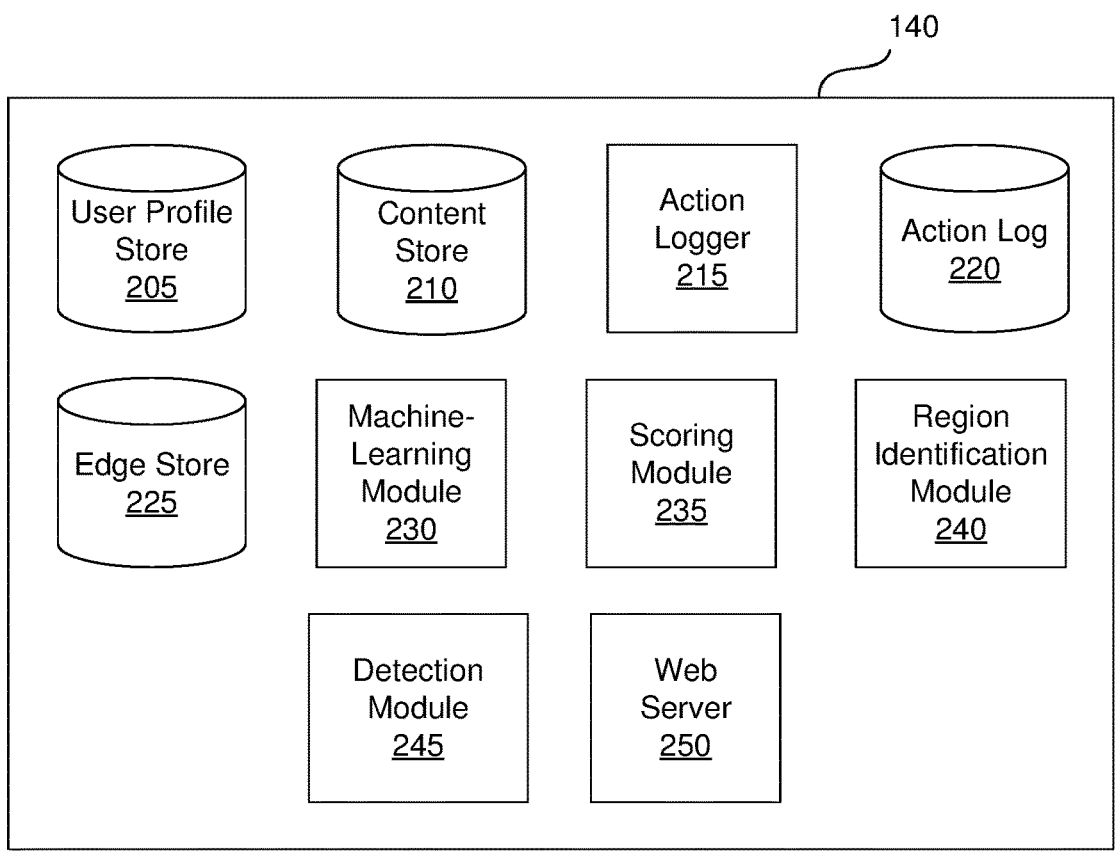
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a machine-learning module 230, a scoring module 235, a region identification module 240, a detection module 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, an image (e.g., a photograph), a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In embodiments in which one or more objects stored in the content store 210 represent images, each object representing an image may be stored in association with a set of pixel values associated with the image. Each pixel of an image may be associated with one or more pixel values. Pixel values may indicate a brightness of a pixel, a color of the pixel, etc. For example, each pixel of a grayscale image may be associated with a pixel value ranging from 0 to 255 that describes a brightness of the pixel. As an additional example, each pixel of a color image may be associated with a set of pixel values representing red, green, and blue components of the pixel.

The content store 210 also may store embeddings (e.g., in a database of embeddings) that correspond to vector representations of various images maintained in the content store 210, such that images containing similar types of content are mapped near each other in vector space. In some embodiments, embeddings stored in the content store 210 correspond to labeled images in which each label corresponds to the content of an image. In such embodiments, the labels may indicate an identity of a brand (e.g., a logo for the brand) or other entity or an obfuscated identity of the brand or other entity (e.g., a blurred or otherwise obscured logo for the brand). For example, a first label may indicate a name of a first brand and that it is not obfuscated, a second label may indicate the name of the first brand and that it is obfuscated, and so on. The brand may include logos or any other indication of source, origin, or sponsorship. For example, a label may indicate a type of stitching, a pattern of colors, or other feature that commonly is associated with a brand or organization. Images may be labeled manually (e.g., by an administrator of the online system 140). Images also or alternatively may be labeled by the detection module 245, described below.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S.

patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The machine-learning module 230 may train a deep learning or machine-learned model to assign regions of interest within an image to one or more classes (e.g., one or more classes indicating various types of objects within the regions of interest). The model may be trained by the machine-learning module 230 using various techniques (e.g., backpropagation and stochastic gradient descent). In some embodiments, the model may include multiple networks, such as a region proposal network that identifies regions of interest within images and a classification network that detects various types of objects within the regions of interest. In such embodiments, the region proposal network may include one or more modules, such as the scoring module 235 and the region identification module 240, which are described below. Furthermore, in such embodiments, one or more layers of the model may be shared among the networks.

In embodiments in which multiple networks of the model share one or more layers, the machine-learning module 230 may train different networks and/or different layers of the networks at different times (e.g., by training the networks in an alternating fashion) or jointly (e.g., by merging the networks into one network during training). For example, if the model includes a region proposal network and a classification network, the machine-learning module 230 may train the model by initializing the region proposal network with a model that is pre-trained using a database of images (e.g., ImageNet) and then fine-tuning the region proposal network. In this example, the regions of interest that are identified by the region proposal network are then used to train the classification network (e.g., using Fast R-CNN), in which the classification network is initialized by a model that also is pre-trained using the database of images. In the above example, the classification network may then be used to initialize training of the region proposal network and while fixing convolutional layers shared by both networks, layers that are unique to the region proposal network are fine-tuned. Continuing with this example, while still fixing the convolutional layers shared by both networks, the layers that are unique to the classification network are then fine-tuned, such that both networks are unified. The functionality of the machine-learning module 230 is further described below in conjunction with FIG. 3.

The scoring module 235 may determine (e.g., as shown in step 320 of FIG. 3) a score associated with each region of interest identified by the region identification module 240, described below. The higher the score associated with a region of interest, the greater the confidence that the region of interest includes salient information that may be used to detect an identity of a brand and/or an obfuscated identity of the brand within the region of interest. Thus, the score indicates a likelihood that a region of interest associated with the score includes an object. Examples of objects include a face, a logo, or any other suitable non-background object. In embodiments in which the scoring module 235 determines a score associated with a region of interest, the score may be used by the region identification module 240 to identify a subset of the regions of interest (e.g., to reduce complexity). In some embodiments, the scoring module 235 may correspond to one or more layers within a region proposal network of the model. In various embodiments, the score may serve as an input to other functioning blocks of a system, as described below. The functionality of the scoring module 235 is further described below in conjunction with FIGS. 3 and 4.

The region identification module 240 identifies (e.g., as shown in step 315 of FIG. 3) a set of regions of interest within an image based on a set of pixel values associated with the image. Similar to the scoring module 235, in some embodiments, the region identification module 240 may correspond to one or more layers within a region proposal network of the model. In such embodiments, the region proposal network may be trained using multiple anchor boxes having different scales and aspect ratios. For example, based on a set of pixel values associated with an image received at the model, a deep convolutional neural network (e.g., VGG-16 or ZF) of the model outputs a convolutional feature map. In this example, a small network that corresponds to the region proposal network and which includes the region identification module 240 is slid over the convolutional feature map. In the above example, the region proposal network receives an n×n spatial window of the convolutional feature map as an input and maps each sliding-window location to a lower-dimension feature (e.g., 256-d or 512-d). Continuing with this example, the region identification module 240 identifies one or more regions of interest within each sliding-window location, in which each region of interest is identified by an x-coordinate, a y-coordinate, a width, and a height of its bounding box. In this example, the regions of interest are regressed with reference to multiple anchor boxes having different scales (e.g., areas of $128^2$, $256^2$, and $512^2$ pixels) and aspect ratios (e.g., 1:1, 1:2, and 2:1) that are centered at each sliding-window location. In the above example, based on the Intersection-over-Union overlap of the anchor boxes with ground-truth boxes that bound objects included in the image, positive or negative labels are assigned to each anchor and a loss function is minimized, such that the anchor boxes are regressed to nearby ground-truth boxes and a set of regressors associated with different scale and aspect ratios are learned.

As described above, in some embodiments, the region identification module 240 may identify (e.g., as shown in step 325 of FIG. 3) a subset of the regions of interest within an image based on a score associated with each region of interest. In the above example, once the region identification module 240 has identified a set of regions of interest, the scoring module 235, which also is included in the region proposal network, may determine a score associated with each region of interest. In this example, the region identification module 240 may then use non-maximum suppression to identify regions of interest associated with at least a threshold score and then rank the identified regions of interest based on their scores. Continuing with this example, the top N ranked regions of interest may then be identified by the region identification module 240.

The region identification module 240 also generates an embedding associated with each region of interest that corresponds to a vector representation of the region of interest. For example, each embedding associated with a region of interest may correspond to a vector having a value associated with each of multiple dimensions that may characterize the region of interest, such that regions of interest containing similar types of content are mapped near each other in vector space. In embodiments in which the region identification module 240 uses scores to identify a subset of the regions of interest within an image, the region identification module 240 may generate an embedding associated with each of the subset of the regions of interest after identifying them. The functionality of the region identification module 240 is further described below in conjunction with FIGS. 3 and 4.

The detection module 245 compares (e.g., as shown in step 330 of FIG. 3) an embedding associated with each region of interest identified by the region identification module 240 to multiple embeddings maintained in the online system 140 (e.g., in the content store 210). As described above in conjunction with the content store 210, the embeddings maintained in the online system 140 may correspond to labeled images, in which each label corresponds to the content of the corresponding image and may indicate an identity of a brand or other entity or an obfuscated identity of the brand or other entity. The detection module 245 may compare embeddings using various techniques that may identify embeddings having at least a threshold measure of similarity to each other (e.g., a k-nearest neighbor classifier, a multilayer perceptron, etc.). For example, using a k-nearest neighbor classifier, the detection module 245 may compare an embedding corresponding to a region of interest within an image to multiple embeddings corresponding to labeled images, in which the labels indicate the types of content that the images contain (e.g., logos of various brands, obscured logos of various brands, etc.).

Based on the comparison of the embedding associated with each region of interest identified by the region identification module 240 to the embeddings maintained in the online system 140, the detection module 245 determines (e.g., as shown in step 335 of FIG. 3) whether an identity of a brand or other entity and/or an obfuscated identity of the brand or other entity is/are detected within each region of interest. Continuing with the above example, the detection module 245 may identify the k-nearest neighboring embeddings and determine the most frequent labels of the images corresponding to the k-nearest neighboring embeddings. In this example, the detection module 245 may determine that an identity of a brand is detected within the region of interest if the most frequent label of the images corresponding to the k-nearest neighbor embeddings corresponds to the identity of the brand. In this example, the detection module 245 also or alternatively may determine that an obfuscated identity of the brand is detected within the region of interest if the most frequent label of the images corresponding to the k-nearest neighbor embeddings corresponds to the obfuscated identity of the brand. In various embodiments, if the detection module 245 determines that an identity of a brand or other entity and/or an obfuscated identity of the brand or other entity is/are detected within a region of interest, the detection module 245 may label the region of interest with a corresponding label. In such embodiments, an embedding corresponding to the region of interest may be stored in the content store 210 in association with the label.

In some embodiments, rather than determining whether an identity of a brand or other entity and/or an obfuscated identity of the brand or other entity is/are detected within each identified region of interest based on an embedding associated with each region of interest, the determination may be made based on a set of pixel values associated with each region of interest. In such embodiments, the set of pixel values may be provided as an input to a machine-learned model (e.g., a multilayer perceptron) that is trained to detect an identity of a brand or other entity and/or an obfuscated identity of the brand or other entity. Furthermore, in such embodiments, an output may be received from the machine-learned model that indicates whether an identity of a brand or other entity is detected within each region of interest and whether the identity of the brand or other entity is obfuscated.

In some embodiments, the images corresponding to embeddings to which the detection module 245 compares an embedding may not be labeled with any labels indicating obfuscated identities of one or more brands or other entities. In such embodiments, once the detection module 245 has determined that an identity of a brand or other entity is detected within a region of interest, the online system 140 may then determine whether the identity of the brand or other entity is obfuscated (e.g., using a multilayer perceptron trained to detect blurred objects). The functionality of the detection module 245 is further described below in conjunction with FIGS. 3 and 4.

The web server 250 links the online system 140 via the network 120 to the one or more client devices 110, as well as to the one or more third-party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Figure 3:
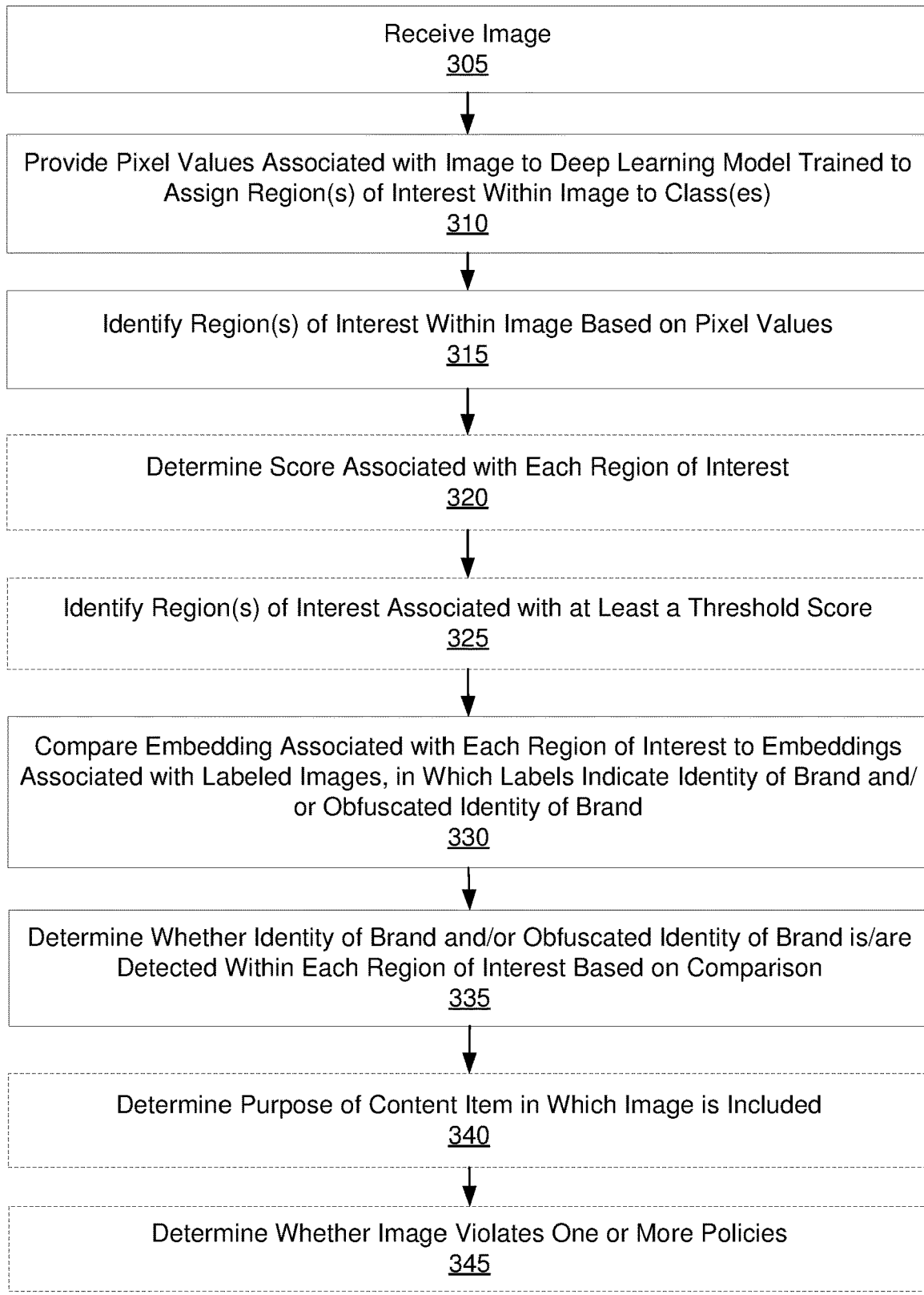
FIG. 3 is a flow chart of a method for detecting an identity of a brand and/or an obfuscated identity of the brand within an image based on embeddings corresponding to regions of interest within the image, in accordance with an embodiment.

Detecting an Identity of a Brand and/or an Obfuscated Identity of the Brand within an Image Based on Embeddings Corresponding to Regions of Interest within the Image FIG. 3 is a flow chart of a method for detecting an identity of a brand and/or an obfuscated identity of the brand within an image based on embeddings corresponding to regions of interest within the image. In other embodiments, the method may include different and/or additional steps than those shown in FIG. 3. Additionally, steps of the method may be performed in a different order than the order described in conjunction with FIG. 3.

Figure 4:
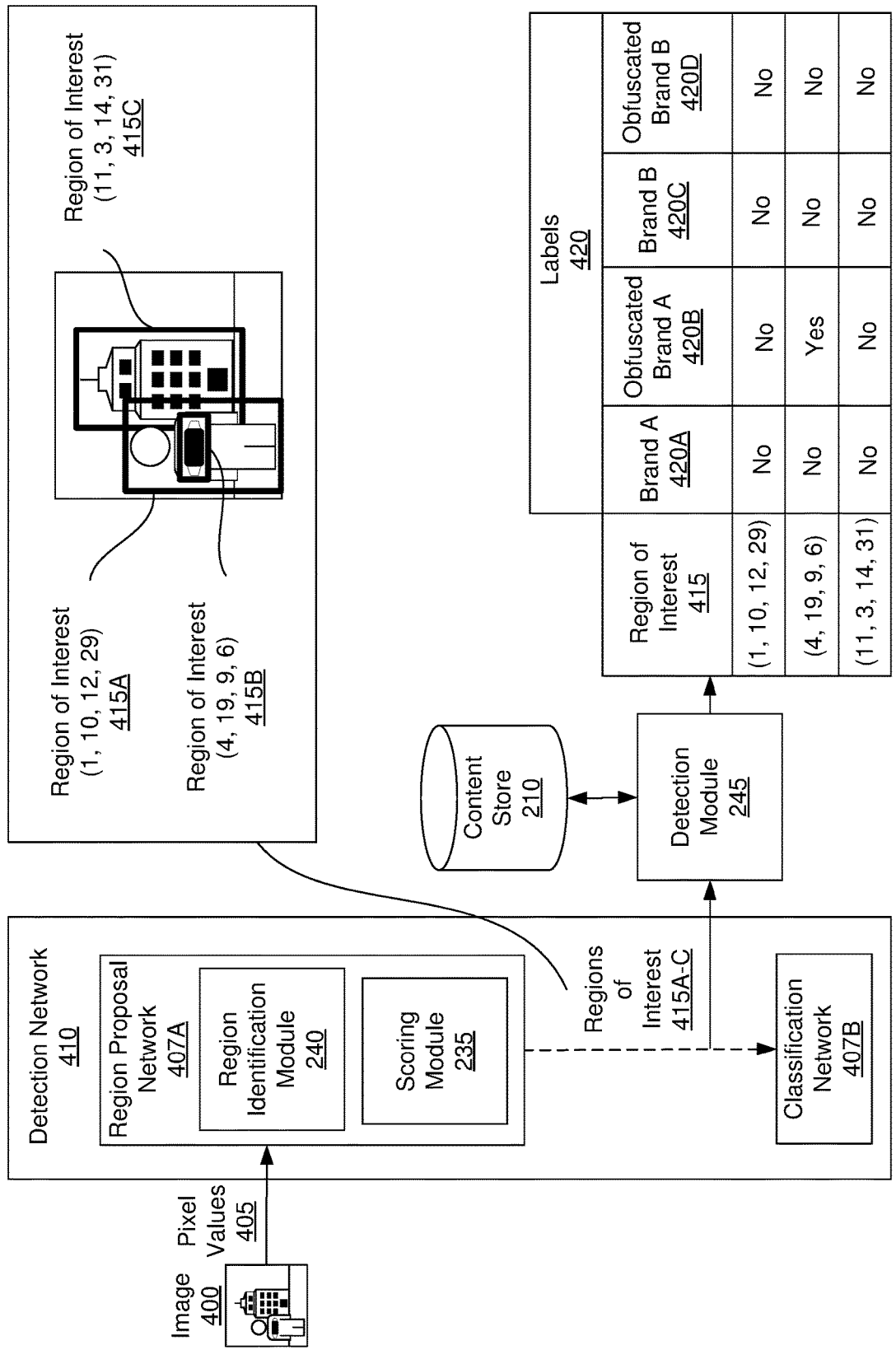
FIG. 4 is a conceptual diagram of detecting an identity of a brand and/or an obfuscated identity of the brand within an image based on embeddings corresponding to regions of interest within the image, in accordance with an embodiment.

The online system 140 receives 305 an image (e.g., an image frame within a video) and provides 310 a set of pixel values associated with the image as an input to a deep learning or a machine-learned model. The model assigns regions of interest within the image to one or more classes (e.g., one or more classes indicating various types of objects within the regions of interest). In some embodiments, the model may be trained by the online system 140 (e.g., using the machine-learning module 230), while in other embodiments, the model may be trained by a third-party system 130. As shown in the example of FIG. 4, an input including a set of pixel values 405 associated with an image 400 is provided 310 to a detection network 410 (i.e., the model), in which the image 400 is of a person standing in front of a building and the person is wearing clothing that includes an obfuscated logo. In this example, the detection network 410 includes a region proposal network 407A and a classification network 407B. Although the region proposal network 407A and the classification network 407B are shown as separate networks, in some embodiments, the region proposal network 407A and the classification network 407B may share one or more layers.

Referring back to FIG. 3, the model is structured to identify 315 (e.g., using the region identification module 240 of a region proposal network) a set of regions of interest within the image based on the set of pixel values associated with the image. Each region of interest identified 315 by the model is associated with an embedding that corresponds to a vector representation of the region of interest. For example, each embedding associated with a region of interest may correspond to a vector having a value associated with each of multiple dimensions that characterize the region of interest, such that regions of interest containing similar types of content are mapped near each other in vector space. The embedding associated with each region of interest also may be generated by the model (e.g., using the region identification module 240 of the region proposal network).

Each region of interest is identified by an x-coordinate, a y-coordinate, a width, and a height of its bounding box. For example, as shown in FIG. 4, the region proposal network 407A of the model identifies 315 three regions of interest 415A-C, in which region of interest 415A corresponds to the person, region of interest 415B corresponds to the obfuscated logo on the person's clothing, and region of interest 415C corresponds to the building. In this example, region of interest 415A is identified by a bounding box having an x-coordinate of 1, a y-coordinate of 10, a width of 12, and a height of 29. In the above example, the x-coordinate indicates that the upper-left corner of the bounding box is located 1 pixel from the left edge of the image 400 and the y-coordinate indicates that the upper-left corner of the bounding box is located 10 pixels from the top of the image 400. Continuing with this example, the bounding boxes identifying regions of interest 415B and 415C are identified in a similar manner. Although the x-coordinates and the y-coordinates of the bounding boxes shown in FIG. 4 correspond to the upper-left corners of the bounding boxes, in alternative embodiments, the x-coordinates and the y-coordinates may correspond to a midpoint of the bounding boxes or to any other suitable point identifying a location of each bounding box. As shown in FIG. 4, in some embodiments, information identifying regions of interest 415A-C may be sent to the classification network 407B, which may detect various types of objects within regions of interest 415A-C.

Referring again to FIG. 3, in some embodiments, the model also may determine 320 (e.g., using the scoring module 235 of the region proposal network) a score associated with each region of interest indicating a likelihood that a region of interest associated with the score includes an object (e.g., a face, a logo, or any other suitable non-background object). As described above, in such embodiments, the model may use the score to identify 325 (e.g., using the region identification module 240 of the region proposal network) a subset of the regions of interest. In such embodiments, the model may generate an embedding associated with each of the subset of the regions of interest after they have been identified 325. In the example of FIG. 4, once a set of regions of interest have been identified 315 and a score associated with each region of interest has been determined 320, the region proposal network 407A may use non-maximum suppression to identify the regions of interest that are associated with at least a threshold score, rank these regions of interest based on their scores, and identify (in step 325) regions of interest 415A-C to be the top 3 ranked regions of interest.

Referring back to FIG. 3, the online system 140 then compares 330 (e.g., using the detection module 245) an embedding associated with each region of interest identified 315, 325 by the model to multiple embeddings maintained in the online system 140. The embeddings maintained in the online system 140 may correspond to labeled images, in which each label corresponds to the content of a corresponding image. Furthermore, the labels may indicate an identity of a brand (e.g., a logo for the brand or visual patterns commonly associated with a product line for the brand) or other entity and/or an obfuscated identity of the brand or other entity (e.g., a blurred or otherwise obscured logo for the brand). The online system 140 may compare 330 the embeddings using various techniques that may identify embeddings having at least a threshold measure of similarity to each other (e.g., a k-nearest neighbor classifier, a multilayer perceptron, etc.). In the example of FIG. 4, using a k-nearest neighbor classifier, the online system 140 may compare (in step 330) embeddings corresponding to regions of interest 415A-C within the image 400 to a database of embeddings (e.g., in the content store 210). In this example, the database of embeddings correspond to labeled images, in which the labels 420 correspond to the types of content they contain and indicate an identity of a brand or other entity and/or an obfuscated identity of the brand or other entity (e.g., logos of various brands, obfuscated logos of various brands, etc.).

Referring again to FIG. 3, based on the comparison, the online system 140 determines 335 (e.g., using the detection module 245) whether an identity of a brand or other entity and/or an obfuscated identity of the brand or other entity is/are detected within each identified region of interest. As shown in the example of FIG. 4, using a k-nearest neighbors classifier, the online system 140 may identify k neighboring embeddings nearest to the embeddings corresponding to regions of interest 415A-C and determine 335 whether an identity of a brand or other entity and/or an obfuscated identity of the brand or other entity is/are detected within regions of interest 415A-C based on the most frequent labels of the images corresponding to the k neighboring embeddings. In the above example, the online system 140 determines 335 that the identities of brands A and B and the obfuscated identities of these brands are not detected within regions of interest 415A and 415C if the most frequent labels of the images corresponding to the k neighboring embeddings nearest to the embeddings corresponding to regions of interest 415A and 415C do not correspond to labels 420A-D. Similarly, in the above example, the online system 140 determines 335 that the obfuscated identity of brand A is detected within region of interest 415B if the most frequent labels of the images corresponding to the k neighboring embeddings nearest to the embedding corresponding to region of interest 415B corresponds to label 420B.

Although not illustrated in FIG. 4, in some embodiments, rather than determining 335 whether an identity of a brand or other entity and/or an obfuscated identity of the brand or other entity is/are detected within each identified region of interest based on an embedding associated with each region of interest, the determination may be made based on a set of pixel values associated with each region of interest. In such embodiments, the set of pixel values may be provided as an input to a machine-learned model (e.g., a multilayer perceptron or other classifier) that is trained to detect an identity of a brand or other entity and/or an obfuscated identity of the brand or other entity. Furthermore, in such embodiments, the online system 140 may receive an output from the machine-learned model that indicates whether an identity of a brand or other entity is detected within each region of interest and whether the identity of the brand or other entity is obfuscated.

Referring once more to FIG. 3, in some embodiments, the embeddings to which the online system 140 compares 330 an embedding may not be labeled with any labels indicating obfuscated identities of one or more brands. In such embodiments, once the online system 140 has determined 335 that an identity of a brand or other entity is detected within a region of interest, the online system 140 may then determine 335 whether the identity of the brand or other entity is obfuscated. For example, once the online system 140 determines 335 that an identity of a brand is detected within a region of interest, the online system 140 may use a multi-layer perceptron trained to detect blurred objects to determine 335 whether the identity of the brand is obfuscated. Furthermore, in various embodiments, if the online system 140 determines 335 that an identity of a brand or other entity and/or an obfuscated identity of the brand or other entity is/are detected within a region of interest, the online system 140 may label (e.g., using the detection module 245) the region of interest with a corresponding label and store an embedding corresponding to the region of interest in association with the label.

Once the online system 140 has determined 335 that an identity of a brand or other entity and/or an obfuscated identity of the brand or other entity is/are detected within a region of interest within the image, the online system 140 may then make other determinations. In various embodiments, the online system 140 may determine 340 a purpose of a content item that includes the image based on whether an identity of a brand or other entity and/or an obfuscated identity of the brand or other entity is/are detected within a region of interest within the image. For example, the online system 140 may determine 340 that the purpose of a content item that includes an image is to sell a brand of product if an identity of the brand is detected within a region of interest within the image. In some embodiments, the online system 140 also may use additional types of information associated with one or more regions of interest within the image to determine 340 the purpose of a content item including the image (e.g., a number of regions of interest within the image, a location of each region of interest within the image, a size of each region of interest within the image, etc.). In the above example, the online system 140 may not determine 340 that the purpose of the content item including the image is to sell the brand of product if the region of interest is the only region of interest within the image in which the identity of the brand is detected, if the region of interest is very small in relation to the size of the image and if the region of interest is within a threshold distance from one or more edges of the image.

In some embodiments, the online system 140 also may determine 345 whether the image violates one or more policies maintained in the online system 140. The online system 140 may do so based on whether an identity of a brand or other entity and/or an obfuscated identity of the brand or other entity is/are detected within a region of interest within the image. For example, the online system 140 may determine 345 that an image violates a policy maintained in the online system 140 that prohibits images of hateful or terrorist content if the image includes a region of interest in which a logo associated with a terrorist organization has been detected.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A method comprising:
 receiving an image at an online system, the image associated with a set of pixel values;
 providing the set of pixel values to a model that is trained to assign each of a set of regions of interest comprising the image to one or more classes, wherein the model corresponds to a machine-learned model or a deep learning model;

identifying, using the model, the set of regions of interest comprising the image based at least in part on the set of pixel values, each of the set of regions of interest associated with an embedding corresponding to a vector representation of a region of interest;

comparing the embedding associated with each region of interest to a plurality of embeddings associated with a plurality of labeled images, the plurality of labeled images labeled with one or more labels indicating one or more of: an identity of a brand and an obfuscated identity of the brand; and determining whether one or more of the identity of the brand and the obfuscated identity of the brand are detected within each of the set of regions of interest based at least in part on the comparing.

2. The method of claim 1, further comprising:

determining a score associated with each of the set of regions of interest, the score indicating a likelihood that a region of interest associated with the score comprises an object;

identifying a subset of the set of regions of interest, wherein each of the subset of the regions of interest is associated with at least a threshold score;

comparing the embedding associated with each of the subset of the regions of interest to the plurality of embeddings associated with the plurality of labeled images; and determining whether one or more of the identity of the brand and the obfuscated identity of the brand are detected within each of the subset of the regions of interest based at least in part on the comparing.

3. The method of claim 1, wherein the plurality of labeled images associated with the plurality of embeddings includes one or more selected from the group consisting of: a logo associated with the brand, a blurred logo associated with the brand, an obscured logo associated with the brand, and a pattern commonly associated with the brand.

4. The method of claim 1, wherein comparing the embedding associated with each region of interest to the plurality of embeddings associated with the plurality of labeled images is performed using a k-nearest neighbors classifier.

5. The method of claim 1, wherein comparing the embedding associated with each region of interest to the plurality of embeddings associated with the plurality of labeled images is performed using a multilayer perceptron.

6. The method of claim 1, wherein comparing the embedding associated with each region of interest to the plurality of embeddings associated with the plurality of labeled images is performed using an additional machine-learned model.

7. The method of claim 6, wherein comparing the embedding associated with each region of interest to the plurality of embeddings associated with the plurality of labeled images comprises:

providing an input to the additional machine-learned model, the input comprising one or both of: a subset of the set of pixel values associated with each region of interest, and the embedding; and receiving an output from the additional machine-learned model that indicates one or more of: the identity of the brand detected within each region of interest and whether the identity of the brand is obfuscated.

8. The method of claim 1, further comprising:

determining whether the image violates one or more policies maintained in the online system based at least in part on whether the one or more of the identity of the brand and the obfuscated identity of the brand are detected within each of the set of regions of interest.

9. The method of claim 1, further comprising:

responsive to determining that the identity of the brand is detected within a region of interest of the set of regions of interest, determining whether the identity of the brand is obfuscated.

10. The method of claim 1, further comprising:

determining a purpose of a content item in which the image is included based at least in part on whether the one or more of the identity of the brand and the obfuscated identity of the brand are detected within each of the set of regions of interest.

11. A computer program product comprising a non-transitory computer readable storage medium having instructions encoded thereon that, when executed by a processor, cause the processor to:

receive an image at an online system, the image associated with a set of pixel values;

provide the set of pixel values to a model that is trained to assign each of a set of regions of interest comprising the image to one or more classes, wherein the model corresponds to a machine-learned model or a deep learning model;

identify, using the model, the set of regions of interest comprising the image based at least in part on the set of pixel values, each of the set of regions of interest associated with an embedding corresponding to a vector representation of a region of interest;

compare the embedding associated with each region of interest to a plurality of embeddings associated with a plurality of labeled images, the plurality of labeled images labeled with one or more labels indicating one or more of: an identity of a brand and an obfuscated identity of the brand; and determine whether one or more of the identity of the brand and the obfuscated identity of the brand are detected within each of the set of regions of interest based at least in part on the comparing.

12. The computer program product of claim 11, wherein the computer-readable storage medium further has instructions encoded thereon that, when executed by the processor, cause the processor to:

determine a score associated with each of the set of regions of interest, the score indicating a likelihood that a region of interest associated with the score comprises an object;

identify a subset of the set of regions of interest, wherein each of the subset of the regions of interest is associated with at least a threshold score;

compare the embedding associated with each of the subset of the regions of interest to the plurality of embeddings associated with the plurality of labeled images; and determine whether one or more of the identity of the brand and the obfuscated identity of the brand are detected within each of the subset of the regions of interest based at least in part on the comparing.

13. The computer program product of claim 11, wherein the plurality of labeled images associated with the plurality of embeddings includes one or more selected from the group consisting of: a logo associated with the brand, a blurred logo associated with the brand, an obscured logo associated with the brand, and a pattern commonly associated with the brand.

14. The computer program product of claim 11, wherein compare the embedding associated with each region of interest to the plurality of embeddings associated with the plurality of labeled images is performed using a k-nearest neighbors classifier.

15. The computer program product of claim 11, wherein compare the embedding associated with each region of interest to the plurality of embeddings associated with the plurality of labeled images is performed using a multilayer perceptron.

16. The computer program product of claim 11, wherein compare the embedding associated with each region of interest to the plurality of embeddings associated with the plurality of labeled images is performed using an additional machine-learned model.

17. The computer program product of claim 16, wherein compare the embedding associated with each region of interest to the plurality of embeddings associated with the plurality of labeled images comprises:
   providing an input to the additional machine-learned model, the input comprising one or both of: a subset of the set of pixel values associated with each region of interest, and the embedding; and
   receive an output from the additional machine-learned model that indicates one or more of: the identity of the brand detected within each region of interest and whether the identity of the brand is obfuscated.

18. The computer program product of claim 11, wherein the computer-readable storage medium further has instructions encoded thereon that, when executed by the processor, cause the processor to:
   determine whether the image violates one or more policies maintained in the online system based at least in part on whether the one or more of the identity of the brand and the obfuscated identity of the brand are detected within each of the set of regions of interest.

19. The computer program product of claim 11, wherein the computer-readable storage medium further has instructions encoded thereon that, when executed by the processor, cause the processor to:
   responsive to determining that the identity of the brand is detected within a region of interest of the set of regions of interest, determine whether the identity of the brand is obfuscated.

20. The computer program product of claim 11, wherein the computer-readable storage medium further has instructions encoded thereon that, when executed by the processor, cause the processor to:
   determine a purpose of a content item in which the image is included based at least in part on whether the one or more of the identity of the brand and the obfuscated identity of the brand are detected within each of the set of regions of interest.

* * * * *